Oct. 3, 1967 KUNISHIGE NOGAMI ET AL 3,345,465
COMPOSITE FRAME HAVING TWO THREE-STAGE CROSSBAR SWITCH LINK FRAMES
Filed March 24, 1964 5 Sheets-Sheet 1

INVENTOR
KUNISHIGE NOGAMI
TORU OHNO

BY Emery Whittemore Sandoe + Graham
ATTORNEY

INVENTOR
KUNISHIGE NOGAMI
TORU OHNO

BY Emery Whittemore Sandoe & Graham

ATTORNEY

NOTE 1: MULTIPLE TO A, B, C WIRES OF CORRESPONDING POSITION OF CORRESPONDING LINE FRAME, WHEN 200 LINE FRAMES ARE REQUIRED

NOTE 2: MULTIPLE TO D, E, F WIRES OF CORRESPONDING POSITION OF CORRESPONDING FRAME, WHEN 200 LINE FRAMES ARE REQUIRED

NOTE 3: MULTIPLE TO EXTENSION TERTIARY SWITCH

INVENTOR
KUNISHIGE NOGAMI
TORU OHNO

BY Emery Whittemore Sandoe & Graham
ATTORNEY

INVENTOR
KUNISHIGE NOGAMI
TORU OHNO

BY Emery Whittemore Sandoe & Shaha
ATTORNEY

INVENTOR
KUNISHIGE NOGAMI
TORU OHNO

BY Emery Whittemore Sandoe & Graham
ATTORNEY

United States Patent Office 3,345,465

Patented Oct. 3, 1967

3,345,465

A COMPOSITE FRAME HAVING TWO THREE-STAGE CROSSBAR SWITCH LINK FRAMES

Kunishige Nogami and Toru Ohno, Yokohama, Japan, assignors to Hitachi Limited, Chiyoda-ku, Tokyo, Japan, a corporation of Japan Filed Mar. 24, 1964, Ser. No. 354,363
1 Claim. (Cl. 179—22)

ABSTRACT OF THE DISCLOSURE

A composite line frame is composed from a first and second line frame to provide a total trunk capacity and extension line capacity equal to the sum of the capacities of the line frames. The frames consist of primary, secondary and tertiary crossbar switches. The secondary crossbar switches have twice the number of terminals required for the line frame when operated as an independent line frame. Each line frame is provided with primary links coupling the primary crossbar switches with the used terminals of the secondary crossbar switches and secondary crossbar switches connecting the secondary crossbar switches with the tertiary crossbar switches. The composite frame is provided by connecting the unused terminals of each secondary crossbar switch in one line frame with the used terminals of the respective crossbar switch in the other line frame.

Figure 1:
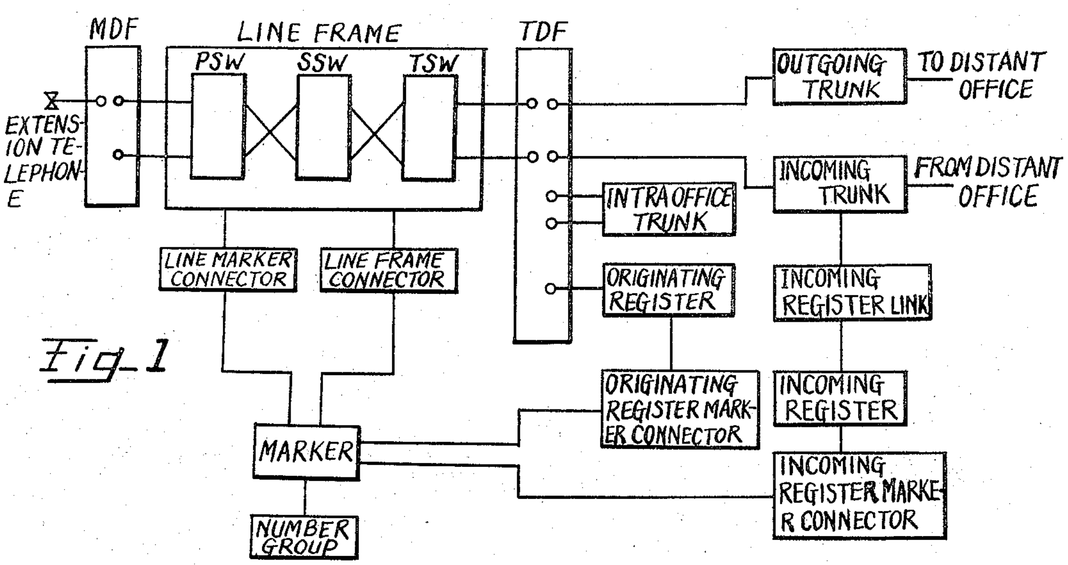

This application is a continuation-in-part of application Ser. No. 72,508 filed Nov. 29, 1960 and now abandoned.

The present invention relates generally to automatic telephone switching systems, more particularly to such systems of so-called crossbar type.

In crossbar switching systems, many crossbar switches are combined together to form talking paths and to carry calls through the switching system. Therefore, the method of combining crossbar switches has a great effect on overall economy of a switching system.

The main object of the present invention is to provide a new and useful method of combining crossbar switches, in order to obtain more economical crossbar switching systems.

In general, a crossbar telephone exchange system consists of talking paths and common control circuits. The talking paths comprise suitably arranged crossbar switches, and this arrangement of crossbar switches is called a "link arrangement," moreover, a certain unit, which comprises a link arrangement of crossbar switches and can accommodate a certain number of extension lines and trunks, is called a "frame." The common control circuits are usually called "markers."

In the heretofore used private branch crossbar exchange system, the installations for the range of about 100 to about 2,000 extension lines are required in most cases, but in this range there exist several kinds of link arrangements. And each of the link arrangements has its most economical arrangement in an inherent small range. In other words, all of these systems have a very narrow range of application and are obliged to accompany the technical difficulties and economical disadvantages when future growth demands an extension of the capacity of the link arrangement beyond their application range.

Another object of the present invention is to avoid the above mentioned defects of the heretofore used link arrangements and to provide the link arrangement and its common control circuits both applicable to a wide range.

The main feature of the present invention is to combine two frames, each of which can accommodate a certain number of extension lines and trunks, into one frame which can accommodate twice the number of extension lines and trunks.

Another feature of the present invention is that the above mentioned combined frame has the same traffic capacity per extension line without requiring any additional crossbar switch.

Further feature of the present invention is that, when combining two frames, the modification of the original internal wiring of the frame is almost unnecessary, but mere addition of some multiple wirings for the link portion and only a small amount of modification of jumper wirings in the common control circuits are necessary. Therefore, the same link arrangement and the same common control circuit can be used for any exchange from a smaller capacity to a large capacity, and the efficiency of crossbar switches has been improved for unexpected increase of extension lines and for an exchange which has a relatively small initial capacity.

Figure 2:
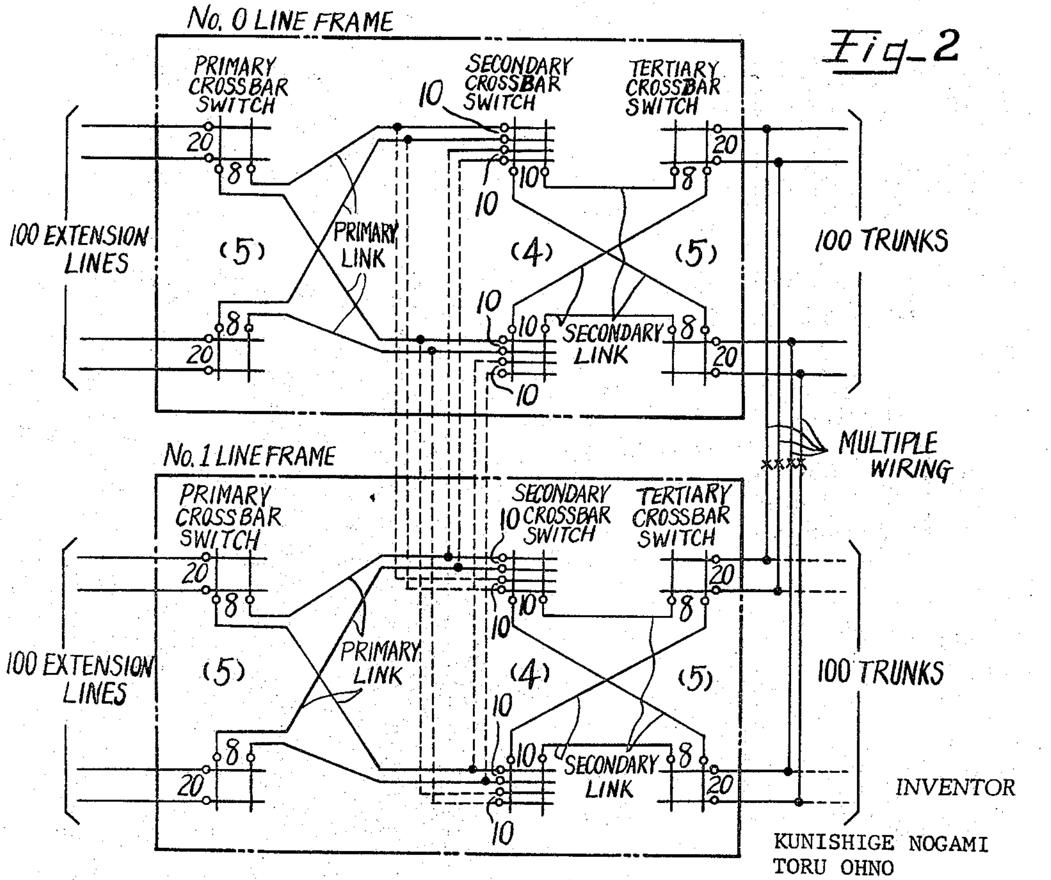
Figure 3:
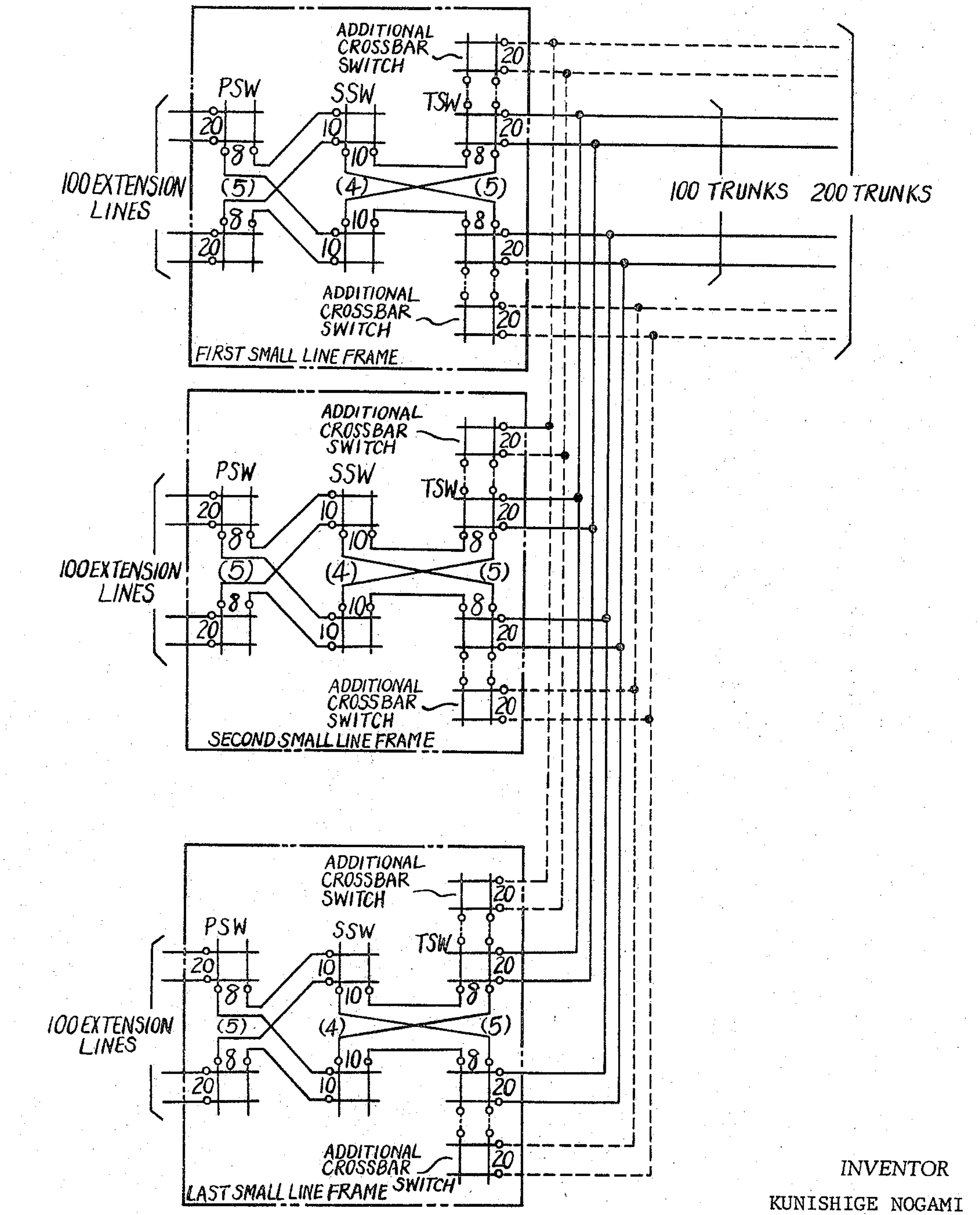
Figure 4:
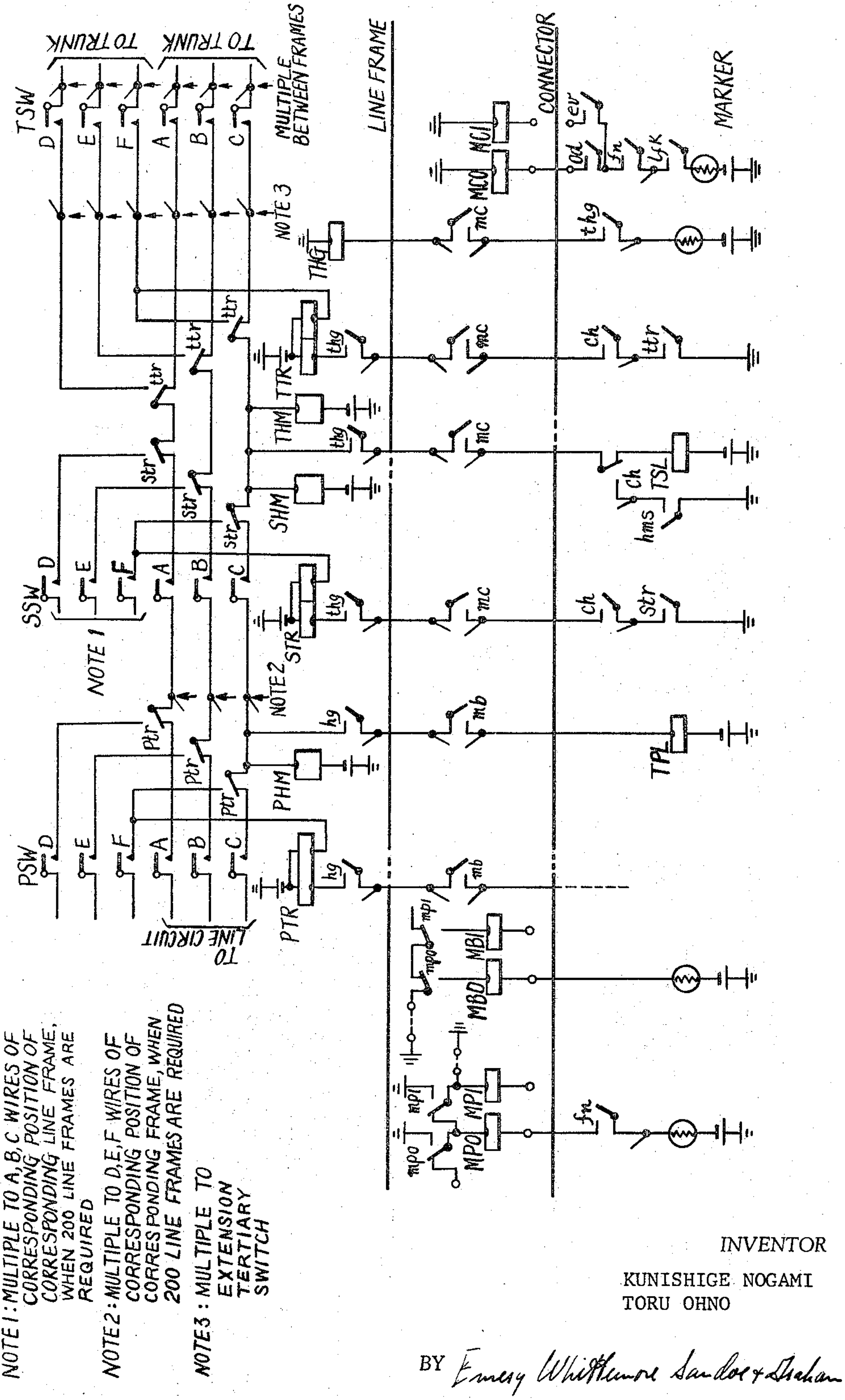
Figure 5:
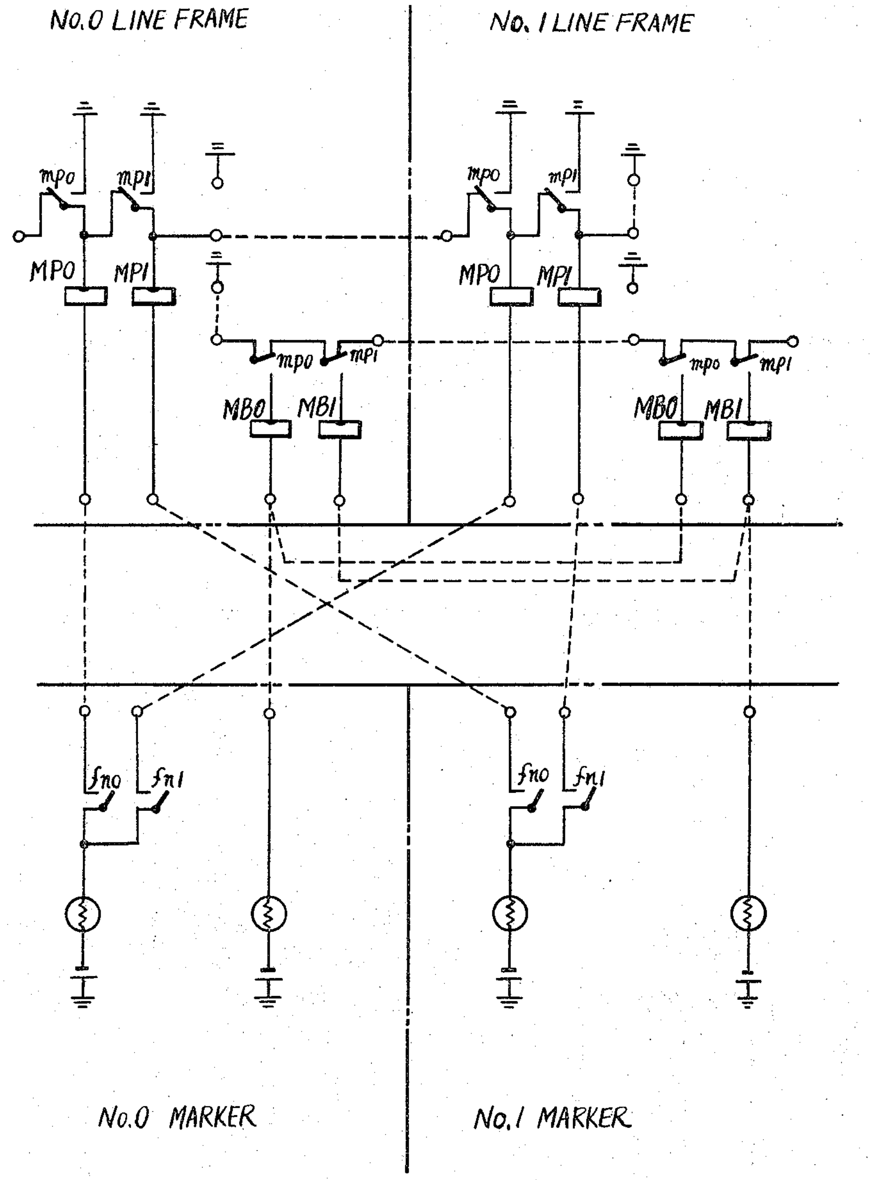
Figure 6:
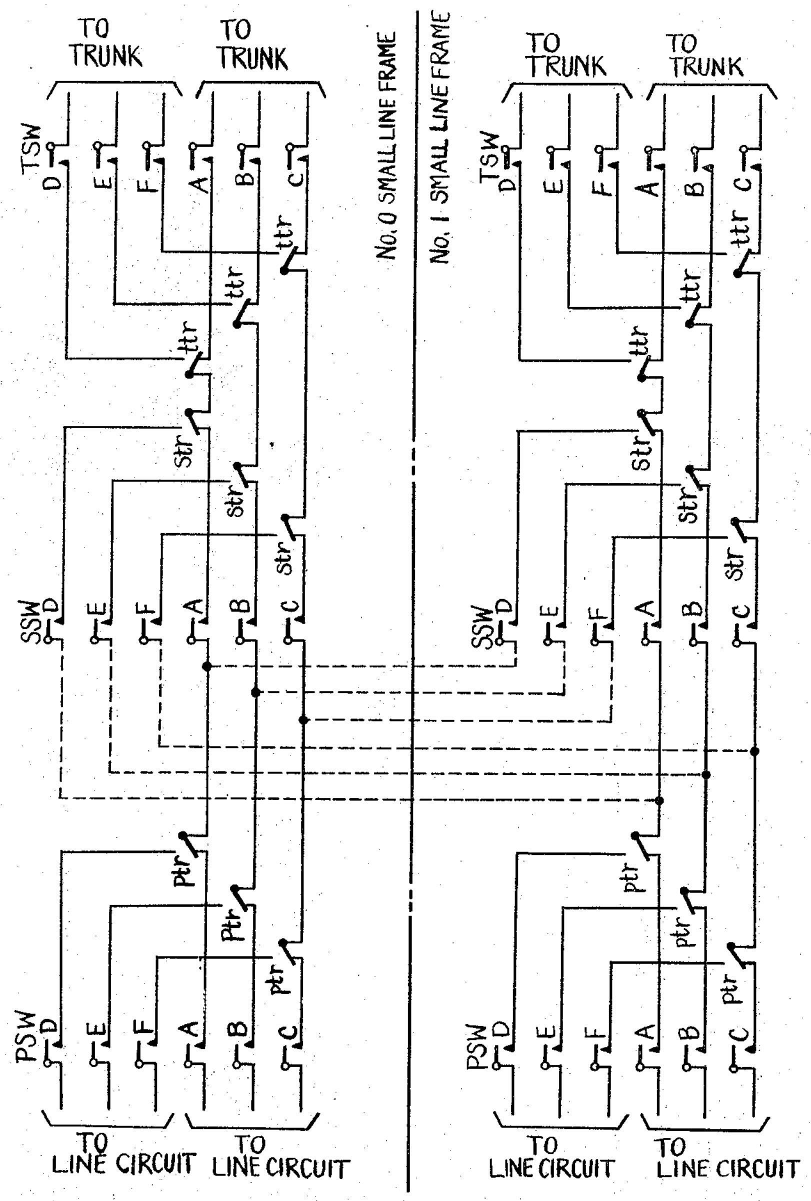

The above objects and features of the present invention may be more readily understood from an examination of the following detailed description and attached drawings, in which;

FIG. 1 shows a basic trunking diagram of a crossbar exchange system employing an embodiment of the present invention, FIG. 2 shows an embodiment of a link arrangement of the present invention, FIG. 3 shows an example of a link arrangement of a heretofore used conventional crossbar exchange system, FIG. 4 is a simplified circuit diagram for illustrating the principle of circuit operation of the present invention, FIG. 5 is a detailed circuit diagram of a lockout circuit which is a part of FIG. 4, and FIG. 6 is a circuit diagram of an embodiment for illustrating a method of modification of two line frames into one combined line frame.

Referring first to FIG. 1, basic trunking scheme of an embodiment of the present invention is shown. Each line frame includes crossbar switches arranged in three stages, namely primary switches PSW, secondary switches SSW and tertiary switches TSW. The horizontals of the primary switches are connected to extension lines, while the horizontals of the tertiary switches give access to incoming trunks, outgoing trunks, intraoffice trunks and originating registers as well as special types of outgoing trunks, such as tone trunks, etc., which are not shown. Intraoffice trunks require two appearances, while other trunks and originating registers require only one appearance.

All switching operations are under the control of common markers to which connection is made by a variety of connectors. Each line frame has an individual line marker connector and a line frame connector, the line marker connector operating under the control of the line frame to connect the line frame with the marker and the line frame connector operating under the control of the marker to connect the marker with the line frame.

To assist the marker and to shorten the time during which it has to be employed with each call, originating registers and incoming registers are employed for receiving the called number. An originating register is connected with the calling line in response to an originating call. An originating register marker connector is employed to connect any one of a group of originating registers with any idle marker. Incoming registers are attached to incoming trunks over an incoming register link and are arranged to receive the numerical designations from a distant office. An incoming register marker connector is employed to connect any one of a group of incoming registers with any idle marker. The line marker connectors, originating register marker connectors and incoming register marker connectors are arranged in that order in a preference chain.

In general, calls in an office of this type may be classified as intraoffice calls, outgoing calls and incoming calls.

When an extension line originates a call, the line frame engages an idle marker over the line marker connector and identifies itself to the marker, and the connector informs the marker that a dialling connection is to be established. The marker now selects an idle originating register and connects to it. As soon as the originating register has been seized, the marker connects with the line frame through the line frame connector and completes the identification of the calling line, a part of which was obtained through the line marker connector. Then the marker selects one of channels which may be used to connect the calling line with the originating register, operates the select and hold magnets of the crossbar switches to complete the channel, and releases. The calling line then dials the designation of the wanted line into the originating register.

When registration has been completed, the originating register seizes an idle marker through the originating register marker connector and transmits to the marker the calling line location and the dialed number. From the dialed number the marker determines whether an intraoffice call is desired or an outgoing connection.

Assuming that an intraoffice connection is indicated, the marker tests for an seizes an idle intraoffice trunk and calls in a number group circuit to determine the location of the called extension line. The marker then sets up a connection between the intraoffice trunk and the called extension line. The marker then releases its connection with the line frame of the called extension line and proceeds to select the line frame of the calling extension line after which it sets up the call back or originating channel. The marker then releases the originating register and itself, leaving the ringing and supervision under the control of the intraoffice trunk.

If an outgoing call is indicated, the marker selects an indle outgoing trunk to a distant office, sets up a connection between the calling extension line and the outgoing trunk and releases.

An incoming call from a distant office causes the seizure of an incoming trunk which responds by connecting to an incoming register through the incoming register link. The numerical designation of the called number is stored by the incoming register. The incoming register transmits the number to the marker. Then the marker calls in a number group circuit to determine the location of the called extension line. The marker connects the incoming trunk with the called extension line over an idle channel and releases.

The link arrangement of an embodiment of the present invention shown in FIG. 2 will now be explained in detail. When used for a relatively small sized system, No. 0 line frame and No. 1 line frame in FIG. 2 are each independently controlled unit with respect to the common control markers, and the connections between them shown by broken lines are not yet established. Each line frame has two primary crossbar switches, two secondary crossbar switches and two tertiary crossbar switches. Each of these six crossbar switches has ten horizontal paths and twenty vertical paths, therefore there are two hundred crosspoints in each crossbar switch, and there are six make contacts in each crosspoint. Each primary crossbar switch has its horizontal multiple cut so as to give the equivalent of two and one-half crossbar switch units of eight verticals instead of one switch of twenty verticals. Thus each line frame has five primary crossbar switch units of eight verticals. The extension lines connect to the horizontal paths or levels on the primary crossbar switch units, and two extension lines appear on each level. The two appearances are obtained by using a six wire crossbar switch and a crosspoint splitting relay for each vertical and operating the crosspoint splitting relay in addition to the select magnet and hold magnet. The crosspoint splitting relay controls the crosspoint which connects the primary link to one or the other of two vertical multiples each consisting of a tip, ring and sleeve, thereby obtaining twenty extension line appearances for each switch unit. The method of splitting a crossbar switch is similar to that disclosed in "160-Trunk Incoming Frames," Bell Laboratories Record, January 1942, page 114. After all, each line frame has five primary crossbar switch units, which are equivalent to a crossbar switch having twenty horizontal paths, eight vertical paths and three make contacts in each crosspoint.

In quite a similar manner, the two secondary crossbar switches are used as four crossbar switch units, each having twenty horizontal paths, ten vertical paths and three make contacts in each crosspoint. As to the two tertiary crossbar switches, they are also used as five crossbar switch units, each having twenty horizontal paths, eight vertical paths and three make contacts in each crosspoint.

The horizontals of the primary crossbar switch units are connected to extension lines, while the verticals are connected to primary links which are arranged so that there are two primary links connecting each primary crossbar switch unit with each secondary crossbar switch unit.

A half of the horizontals of the secondary crossbar switch units are connected to primary links as mentioned above, but the remaining half of the horizontals of the secondary crossbar switch units are not used, and the verticals are connected to secondary links which are arranged so that there are two secondary links connecting each secondary crossbar switch unit with each tertiary crossbar switch unit.

As for the tertiary crossbar switch units, the verticals are connected to secondary links as mentioned above, while the horizontals give access to trunks.

After all, in a smaller sized system these line frames can accommodate one hundred extension lines in horizontals of the primary crossbar switch units and one hundred trunks in horizontals of the tertiary crossbar switch units. These line frames are provided for each one hundred extension lines. For instance, if there are six hundred extension lines in one office, six line frames must be provided and the horizontals of the tertiary crossbar switch units are made multiple throughout all the six line frames to form one exchange system. These multiple wirings are shown by solid lines in FIG. 2.

When the extension lines have increased to eight hundred lines, and suppose the total number of trunks has exceeded one hundred as a result, in the heretofore used system, eight line frames are provided and additional crossbar switch units must be connected to the tertiary crossbar switch units of all the eight frames in order to accommodate the increased trunks as shown in FIG. 3.

According to the present invention, however, there is no necessity of additional tertiary crossbar switch units, since two line frames can be modified to one combined line frame which can accommodate two hundred extension lines and two hundred trunks without providing any additional crossbar switch. For this modification, the horizontal paths of the secondary crossbar switch units of two line frames which should be combined to one frame are simply connected in multiple with each other as shown by broken lines in FIG. 2. This multiple wiring is so made that the horizontal paths of the secondary crossbar switch units of one line frame which are used as primary links are connected to the horizontal paths of the secondary crossbar switch units of the other line frame which are not used as primary links. Moreover, the multiple wirings between the horizontals of the tertiary crossbar switch units of two line frames are cut off at the point shown by mark "*x*" to accommodate the increased trunks to the combined frame. Since the multiple wiring between the horizontals of the secondary crossbar switch units of two line frames is simple and plain addition of wirings, the cutting off of the multiple wirings between the horizontals of the tertiary crossbar switch units of two line frames is also simple and plain, and there is no modification work which requires to change a large amount of wirings from certain terminals to other terminals, therefore, this combining work of two line frames can be done very easily.

The principle of the circuit operation of an embodiment of the present invention will be explained hereinafter with reference to FIG. 4. In this embodiment the detailed parts of the circuit of the various equipments, such as line frames, markers, originating registers, etc., are assumed to be similar to those of the well known crossbar switching system, an example of which will be found in the United States Patent No. 2,585,904 "Crossbar Telephone System" patented Feb. 19, 1952 to A. J. Busch, so that the description will be made mainly to the particular points which are inherent to the present invention.

With regard to other points, which are not explained in this specification and are considered as well known matter to those skilled in the art, reference should be made to the above mentioned United States patent.

In the crossbar switching system of the present embodiment the operation of the common control marker for an originating call differs slightly from that for a terminating call, but in controlling the crossbar switches the same operation is applied to both originating and terminating calls, therefore the explanation of the circuit operation will be made regarding the dial tone connection.

From initiation of a call by an extension telephone to identification, the operation of the circuits of the present embodiment is similar to the well known process from "Dial Tone Connection Originating Call" to "Horizontal Group Identification" in the detailed description of the U.S. Patent No. 2,585,904. Upon the identification of an originating extension line, the marker seizes the line frame on which the extension line is located. This seizure is performed by supplying start battery to the line frame connector by contact "*fn*" of relay FN corresponding to the line frame number. At this moment, an attempt to seize the line frame by other markers is locked out by the lockout circuit of the line frame. This lockout circuit is composed mainly of relays MP0 and MP1. When other markers have been locked out, relay MB0 in the line frame connector operates to connect the marker with the line frame. Then relay MB0 will operate its operation checking relay LFK (its coil is not shown), which in turn operates by its contact "*lfk*" relay MC0 in the line frame connector.

When the desired trunk (i.e., the originating register in this case) is selected, relay THG (not shown) of the marker operates, indicating in which tertiary crossbar switch the desired trunk is accommodated. Then its contact "*thg*" operates relay THG in the line frame. And, relay HG (its coil is not shown) in the line frame is operated by the marker when the identification of the extension line is finished. This relay HG indicates in which primary crossbar switch unit the calling extension line is located. Then, the marker selects idle primary links by relays TPL, and idle secondary links by relays TSL. These TPL and TSL relays in FIG. 4 represent a group of relays actually mounted on the line frame and the number of relays in either group is equal to the number of the links which can be selected.

Depending upon a result of selection done by relays TPL and TSL, the marker selects a channel between the calling extension line and the seized trunk by the well known method described in a chapter "Detailed Description, Selection of Connecting Path or Channel" of the above mentioned United States patent.

When the channel has been selected, relay CH (not shown) operates in the marker, indicating the selected channel. Relay CH like relays TPL and TSL represents a group of those relays. The marker now operates select magnets of the primary, secondary and tertiary crossbar switches in accordance with the collected information including the selected channel, ascertains their operation, and operates the hold magnet operating relay HMS (not shown). With the operation of contact "*hms*," hold magnets SHM of the secondary crossbar switch and THM of the tertiary crossbar switch are operated over contact "*ch*," contact "*mc*" of the line frame connector and contact "*thg*" in the line frame.

Primary crossbar switch hold magnet PHM is operated, when the crosspoint of the secondary crossbar switch is closed, by the ground potential which has operated SHM and supplied over C wire.

The primary crossbar switch splitting relay PTR operates due to the location of the calling extension line if it is necessary, and the tertiary crossbar switch splitting relay TTR operates due to the location of the trunk if it is necessary. The operation of the secondary crossbar switch splitting relay STR will be explained later.

Through the above mentioned method the connection between the calling extension line and the trunk is carried out.

In the crossbar switching system of the present invention two line frames can be combined to one large line frame, therefore the line frame and the common control circuit should be designed not to cause any disturbances of the circuit operation before and after the conversion of the two line frames into one combined line frame. The particular points considered for the control of the line frame of the present invention will be explained with reference to FIGS. 4, 5 and 6 as follows.

In the following description the line frame which can accommodate one hundred extension lines and one hundred trunks will be called a "small frame," while the combined line frame which has been combined from two line frames and can accommodate two hundred extension lines and two hundred trunks will be called a "large frame" or "combined line frame."

The line frame connector is divided into two parts, the extension line part operating under the control of the marker to connect the marker with the primary crossbar switch and the primary link of the line frame and the trunk part operating under the control of the marker to connect the marker with the secondary crossbar switch, the secondary link and the tertiary crossbar switch of the line frame. In FIG. 4 the extension line part of the line frame connector is designated as MB0 and MB1 relays and is controlled by the location of the extension line, while the trunk part of the line frame connector is designated as MC0 and MC1 relays and is controlled by the location of the trunk. When the line frame is used as a small frame, both parts of the line frame connector are operated as one unit, just like a conventional line frame connector in the heretofore used ordinary crossbar exchange system. However, when two line frames are combined and used as one combined line frame, the extension line part and the trunk part of the line frame connector are operated as independent units. That is, when the marker controls a large frame, the marker seizes one of small frames in which the extension line is located, operates the relay MP and relay MB and connects various control leads through the contacts "*mb*" of the extension line part of the line frame connector. As long as the marker is connected to one of small frames, the other one of small frames will not be seized by another marker, and the detail of the lockout between two small frames will be explained later.

After the seizure of the extension line part of the line frame connector the marker identifies in which one of two line frames the selected trunk is located, and operates the trunk part of the line frame connector. The connector relay MC of the trunk part of the line frame connector of the small line frame is operated by the contacts "*od*" or "*ev*" of the trunk location identification relay OD or EV (not shown) to connect various leads by its contacts "*mc*."

Before the line frames are combined the identification of the location of the selected trunk is not necessary and the marker keeps relay OD or EV (not shown) always operating and it is only necessary to operate the trunk part of the line frame connector belonging to the same small line frame as the extension line part of the line frame connector.

As to the lock out between markers and the line frames, when the line frame is used as a small frame, the lock out between the marker and the line frame is performed in quite the same manner as the heretofore used conventional crossbar exchange system. The circuit in this case is shown in FIG. 4. This circuit employs a well known double-transfer lockout circuit, the principle and operation of which will be found described at pages 346–351 of the text book "The Design of Switching Circuits" by William Keister et al. On the other hand, when the line frame is used as a combined line frame, one of two small line frames should not be seized from a marker while the other small line frame which constitutes a large frame in combination with the former small line frame is seized by another marker. According to the present invention, the lockout circuit of the line frame is so designed that the lockout circuits of the both line frames can be connected together and operate as one lockout circuit. The detailed lockout circuit of the combined line frame is shown in FIG. 5. In short, during the one small frame (No. 0 line frame) is seized by No. 0 marker, No. 1 marker is brought to waiting condition in the lockout circuit when No. 1 marker operates to seize the other small frame (No. 1 line frame).

Furthermore, when the line frames are combined, for the connection between an extension line being located in one of the small line frames and the selected trunk being located in the other small line frame, the secondary crossbar switch splitting relay STR is operated to split the horizontal paths of the secondary crossbar switch by its contact "*str*" and extends the talking path to the other small line frame. When the marker recognizes that the extension line and the selected trunk are located in different small line frames with each other, the marker operates the splitting relay STR. The details of the above mentioned relation are illustrated in FIG. 6. Broken lines in FIG. 6 illustrate the connections to be added when the two small line frames are combined to one combined line frame.

According to the present invention, the extension line capacity per line frame and the trunk capacity per line frame are increased to two times by combining optional two small line frames with a constant number of crossbar switches per line frame and also the constant allowable traffic per extension line.

Because internal congestion of a small line frame and a combined line frame is expressed as follows;

$$Bs=\left\{\left(\frac{As}{40}\right)^2+\left[1-\left(\frac{As}{40}\right)^2\right]\left(\frac{As}{40}\right)^2\right\}^4$$

$$B_1=\left\{\left(\frac{A_1}{80}\right)^2+\left[1-\left(\frac{A_1}{80}\right)^2\right]\left(\frac{A_1}{80}\right)^2\right\}^4$$

where, $Bs$=Internal congestion of a small line frame.
$B_1$=Internal congestion of a combined line frame.
$As$=Applied traffic to a small line frame.
$A_1$=Applied traffic to a combined line frame.

So if we assume $2As=A_1$, then $Bs=B_1$.

That is, with a constant internal congestion, a combined line frame has twice as large traffic handling capacity as a small line frame, and a combined line frame has twice as large extension line capacity as a small line frame. Therefore, both the small line frame and the combined line frame have equal allowable traffic capacity per extension line.

It is to be understood that the above described embodiment is merely illustrative of the application of the principle of the invention. Various other modifications may be made by those skilled in the art without departing from the spirit and scope of the invention.

What we claim is:

A composite line frame comprising a first and second line frame;

each of said line frames comprising primary crossbar switches, secondary crossbar switches, and tertiary crossbar switches, said secondary crossbar switches having twice as many terminals as required for said line frame when operating as an indepedent line frame, primary links connecting said primary crossbar switches with the used terminals of said secondary crossbar switches, secondary links connecting said secondary crossbar switches with said tertiary crossbar switches;

and means connecting the unused terminals of each secondary crossbar switch in one line frame with the used terminals of the respective crossbar switch in the other line frame.

References Cited

UNITED STATES PATENTS 2,911,477 11/1959 Gohorel et al. ---- 179—22 XR
3,041,409 6/1962 Zarouni ------------- 179—22
3,046,352 7/1962 Hutton et al. -------- 179—22

KATHLEEN H. CLAFFY, *Primary Examiner.*

L. A. WRIGHT, *Assistant Examiner.*